Jan. 29, 1952   R. C. SMITH   2,584,055
SEQUENCE CONTROL MECHANISM
Filed Feb. 5, 1948

Richard C. Smith
*INVENTOR.*
BY
HIS PATENT ATTORNEY

Patented Jan. 29, 1952

2,584,055

UNITED STATES PATENT OFFICE 2,584,055

SEQUENCE CONTROL MECHANISM

Richard C. Smith, Snyder, N. Y., assignor to Curtiss-Wright Corporation, a corporation of Delaware Application February 5, 1948, Serial No. 6,497

4 Claims. (Cl. 74—471)

1

The present invention relates generally to control mechanisms and more particularly to improved arrangements and mechanisms for the selective control of a plurality of instrumentalities in a definite sequence of operation.

In the design of many machines and mechanisms, it is often desirable or even mandatory that provision be made for automatically operating elements of the machine or mechanisms from a single set of manual or other controls in a predetermined or desired sequence. Such requirements exist in aircraft engine installations of the reaction jet type in which it is necessary to initially open the high pressure fuel supply to the engine before the engine can be run and controlled by the throttle. Conversely, in order to shut off such an engine, it is necesary to first retard the throttle and then to shut off the high pressure fuel source. In view of the numerous controls and instruments which it is necessary that the pilot of an aircraft operate and examine at frequent intervals, it is desirable that both the fuel shut-off valve and the engine throttle be controlled from a single actuating member, accessible to the pilot or operator. The present invention is directed to an improved device for accomplishing the desired sequence of operation in connection with engine and similar installations. In such installations, is is also advantageous, particularly in the operation of aircraft, that the mechanism for accomplishing these sequence operations be made as simple and foolproof as possible, and that they preferably be operated by a single manual control means. It is also desirable that such mechanisms be automatic in their operation and provide for irreversible action in order to prevent disturbance of the position to which the several devices may have been adjusted.

It is, accordingly, a primary object of this invention to provide an improved mechanism by which a series of sequential operations can be accomplished from a single actuating means. It is a further object to provide a mechanism of the foregoing character in which a predetermined range and travel can be obtained in the desired sequence. It is another object to provide a simple, positive acting and foolproof means for operating automatically, and in the proper sequence, a plurality of devices in the prescribed manner. A further object resides in the provision of a sequence mechanism having overriding and lost-motion means of a unitary construction which is adapted to be readily attached or connected to a control system having the present requirements of sequential operation.

2

A still further object of the present invention resides in the provision of a unitary overriding and sequence mechanism which is automatically and positively locked in certain of its positions to provide irreversibility of the connected operating mechanism and the devices which are operated thereby. It is another objective to provide mechanism of the type described provided with guide slots and notches having improved contours and relationships by which back-pressure on the mechanism cannot effect a displacement of any of its parts. It is a still further object to provide an improved mechanism for the overriding and sequential control of the high pressure fuel source and control throttle of an aircraft engine installation of the reaction jet type.

Other objects and advantages of the present invention will occur to those skilled in the art after a reading of the present description taken together with the accompanying drawings, forming a part hereof, in which.

Figure 1:
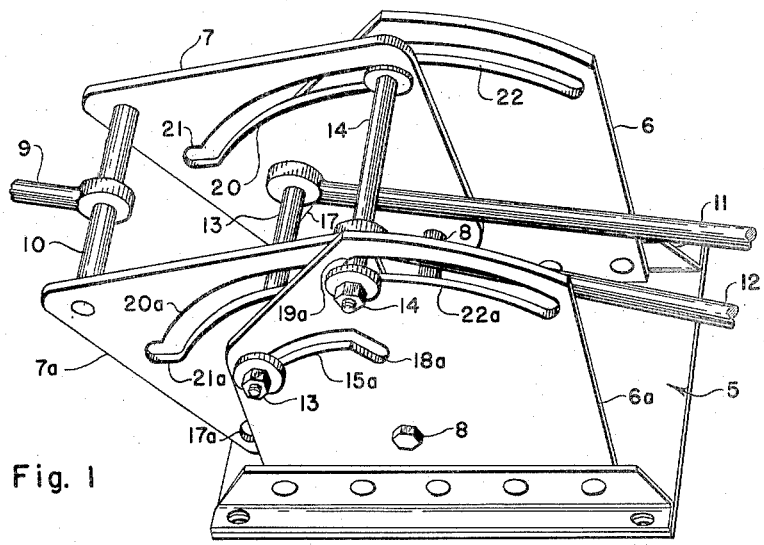
Figure 1 is a perspective view of the sequence actuating mechanism.

Referring now to Figure 1, it will be noted that the sequence mechanism is mounted upon a base assembly 5 to which are attached the vertical fixed supports 6 and 6a. These fixed supports 6 and 6a are laterally spaced apart and have disposed therebetween a pair of bell-crank members 7 and 7a which are pivotally mounted upon the fixed support at the pivot 8. The bell-cranks 7 and 7a are actuated by a control push-pull member 9 to which it is pivotally joined by the pivot rod 10. The bell-crank members 7 and 7a, in cooperation with the support members 6 and 6a, in turn actuate the controlled push-pull links 11 and 12, by virtue of their respective pivotal rollers 13 and 14, which are common to both the support plates 6 and 6a and the bell-cranks 7 and 7a as the result of these pivotal rollers extending through arcuate slots in these support plates, which slots will be more fully described below. For the purposes of the present description, it will be understood that the push-pull link or rod 11 is operatively connected to a shut-off valve for a high pressure fuel source and the push-pull link or rod 12 is similarly operatively connected to the engine throttle control; although obviously the improved mechanism which is shown and described herein has general application and will operate satisfactorily in other than those installations which are described herein for illustrative purposes.

The support members 6 and 6a are each provided with lower and upper sets of arcuate guide or camming slots, the lower slots being 15 and 15a, respectively, provided at their forward or right hand ends, as viewed in the accompanying drawings, with downwardly directed notches 18 and 18a; the upper slots in these support members being 22 and 22a, which are provided at their rearward or left ends with downwardly directed notches 19 and 19a. The bell-crank members 7 and 7a are also provided with corresponding lower and upper sets of arcuate guide slots and notches, the lower slots being 17 and 17a with upwardly directed notches 16 at their forward or right ends, and the upper slot sets being indicated by the numerals 20 and 20a having upwardly directed notches 21 and 21a at their rearward or left ends. Each of these arcuate slots are arcs of circles having the axis of the pivot 8 as the center.

Figure 2:
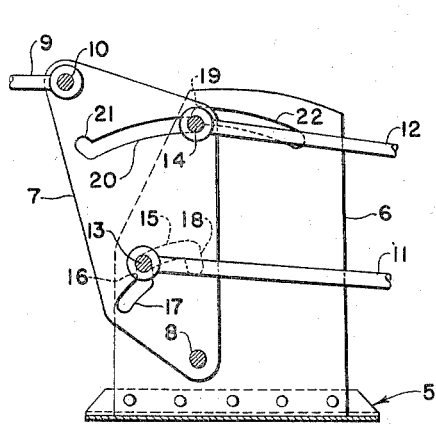
Figure 2 is a cross-sectional diagrammatic view of the mechanism of Figure 1, with the controlled devices in the retarded or "off" position.

Referring now to Figure 2, which is a cross-section of the assembly of Figure 1 showing the rearmost bell-crank member 7 and the vertical support member 6 only, it will be noted that the bell-crank 7 is in its rearward or "off" position in which the axis of the pivot 10 is disposed to the left of the axis of the bell-crank 8; and the roller pivots 13 and 14 are each disposed at the forward ends of the movable bell-crank slots and at the rearward ends of the fixed slots in the supporting member 6. It will be understood that, with the control member 9 in its retracted or leftmost position of Figure 2, the fuel valve operatively connected to the link 11 will be in its "off" or closed position, as will also be the engine throttle operatively connected to the link 12.

Figure 3:
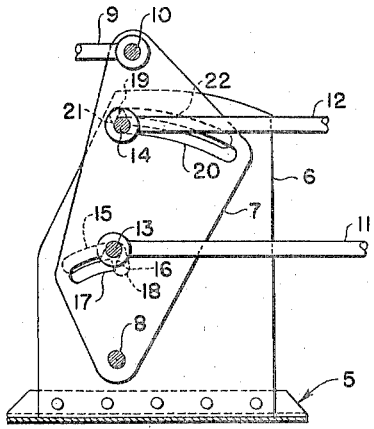
Figure 3 is a similar diagrammatic view of the mechanism in its intermediate or mid-position.

Let us assume now that the control member 9 is pushed forward or to the right into the position shown in Figure 3, in which the axis of the pivot 10 is disposed substantially vertically above the axis of the bell crank pivot 8. It will be seen that the cooperative action of the slots 15 and 17 has caused the pivot roller 13 connected to the link 11 to be moved forward or to the right into a position in which the pivot 13 is also disposed substantially above the pivot axis 8; and the link 11 has been moved toward the right to thereby open the high pressure fuel valve to which this link is connected. This forward movement of the pivot 13 is caused by the cooperative action of the notch 16 at the forward end of the bell-crank slot 17 which serves to push the link 7 forward as the bell-crank is moved forwardly, or rotated in the clockwise direction about its pivot 8, the pivot 13 moving along the forwardly opened fixed slot 15 until it reaches the end thereof, above the adjoining notch 18.

In the meantime, it will be noted that the pivot 14, to which the link 12 for the engine throttle is connected, has remained in its initial position in which it was vertically disposed above the bell-crank pivot 8 and accordingly the engine throttle has not been actuated during this initial half phase of the operation of the mechanism. This is due to the initial position of the pivot 14 at the end of the slot 20 in the bell-crank 7 being retained within the notch 19 of the slot 22 in the support 6, while the bell-crank 7 and its slot 20 are moved or rotated forwardly into the position shown in Figure 3. This discrimination of the bell-crank 7, in moving the pivot 13 forward while permitting the pivot 14 to remain in its initial position, is due to the location of the notches 16 and 18 being at the forward ends of their respective slots 17 and 15, whereas in the case of the pivot 14, the notches 19 and 21 are disposed at the rearward terminals of the slots 22 and 20, respectively. Due to the notch 16 in the bell-crank 7 engaging the pivot 13, the latter moves with the bell-crank during its initial half of the movement, and also for the reason that the notch 19 of the fixed support engages the upper pivot 14, the latter is retained by the fixed support and the bell-crank with its slot 20 is permitted to be moved past the relatively fixed upper pivot 14, thereby preventing movement of the link 12 and its associated throttle. Thus in the first half of the forward movement of the control rod 9, the fuel valve associated with the link 11 is opened, while the throttle connected to the link 12 is maintained in its initially closed position.

Figure 4:
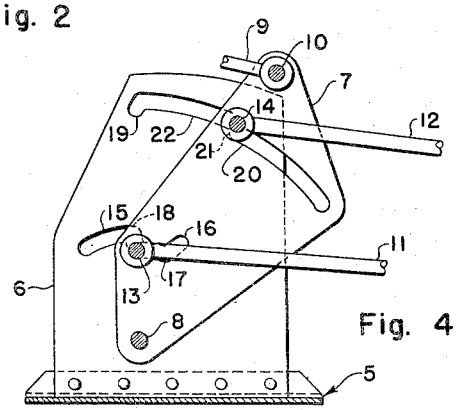
Figure 4 is a similar view showing the mechanism in its extended or full "on" operating position.

Referring now to Figures 3 and 4, let us assume that the forward movement of the control rod 9 is continued from its mid-position, shown in Figure 3, to its fully extended or forward position shown in Figure 4. In the mid-position shown in Figure 3, it will be seen that the cooperating slots 15 and 17 for the lower pivot 13 are adjacent to or co-extensive with each other, with their respective notches 18 and 16, in engagement with the pin 13, disposed at the forward terminals of the respective slots. On the other hand, while the upper pivot 14 is also engaged by the notches 21 and 19, of the respective slots 20 and 22 of the bell-crank and the fixed structure respectively, these notches are disposed at the rearward or trailing ends of the slots. It will also be noted that the lower pivot 13 has the bell-crank slot 17 disposed behind or to the left of the pivot into which it may be guided without concurrent movement of the bell-crank, and the upper pivot 14 is at the rearmost end of the bell-crank slot 20 substantially within the slot 21 with which it will be compelled to move forwardly upon further rotation of the bell-crank. Accordingly, as the bell-crank is rotated in the clockwise direction from its mid-position of Figure 3 to the full or extended position of Figure 4, the pivot 13 is lowered slightly into the notch 18 of the fixed support 6 at which position the arcuate slot 17 in the bell-crank is permitted to pass over the pivot 13 without imparting forward movement thereto. Each pair of notches 16 and 18, and 19 and 21, exert a camming action to lower and lift the corresponding pivots 13 and 14, respectively as forward movement is continued past the mid-position. On the other hand, the upper pivot 14 had already been passed by during the initial movement of the bell-crank 7 and its slot 20, such that this pivot is now engaged by both notches 19 and 21 at its rearward end. Accordingly, as the bell-crank is rotated beyond its mid-position, these two notches cooperate to lift the pivot 14 upwardly into the end of the notch 21 and into the arcuate path of the fixed slot 22 through which it is moved concurrently with continued forward movement of the control member 9 and the further rotation of the bell-crank 7.

Accordingly during the last half of the movement of the control member 9, the link 11, through the relatively fixed position of its connected pivot 13 is maintained in its position keeping its associated fuel valve open, whereas the upper pivot 14 associated with the link 12 is moved forwardly causing the link 12 to adjust the throttle into its open position. The relative movements of the associated elements in the present mechanism may be more particularly understood by noting that in the starting position in Figure 2 in which both the fuel valve and the throttle are in the "off" position, the pivots 8, 10 and 13, are substantially aligned along an upwardly and leftwardly sloping line, while the pivot 14 is vertically disposed above the bell-crank pivot 8. As the control member 9, however, is pushed forwardly into the mid-position of the mechanism as shown in Figure 3, due to the immobility of the upper pivot 14, the pivots 10 and 13 are moved from their sloping line to a position in which all four of the pivots are substantially vertically aligned. Due, however, to the immobility of the lower pivot 13 during the last half of the movement, and the forward movement of the upper pivot 14 concurrently with the control member pivot 10, the pivots 8 and 13 remain in substantial vertical alignment when the full or extended position is reached, while the pivots 10, 14 and 13 are in substantial alignment along an upwardly sloping line toward the right as shown in Figure 4.

It will, accordingly, be noted that the presently described mechanism permits the selective operation of two controlled devices or instrumentalities causing the selective operation of one of these devices, while permitting the overriding of the other during the first half of the operation of the mechanism; and causing the overriding of the initial device during the second half of the operation, while causing selective actuation of the second controlled device. It will be apparent to those skilled in the art that as the control member 9 is returned from its full position of Figure 4 to the mid-position of Figure 3, the pivot 14 and the associated link 12 connected to the throttle will serve to close the throttle while at the same time the fuel valve associated with the pivot 13 and the link 11 will be maintained in its open position. As the control member 9 is further withdrawn to its initial or starting position, as shown in Figure 2, it will be seen that, while no further movement is imparted to the pivot 14, the link 12 and the associated throttle, the lower pivot 13 is withdrawn rearwardly with the bell-crank 7, imparting movement to the connected link 11 and serving to close the fuel valve associated therewith. Accordingly, as the mechanism is returned from its full position to its initial starting position, the controlled devices are actuated in the reverse order of the forward movement of the mechanism thereby insuring positive and foolproof actuation of the fuel valve and engine throttle.

As indicated above, the present mechanism is not limited to use with the specific instrumentalities which have been described herein, but has general application and is capable of advantageous and satisfactory results in other installations, which are required to be operated in accordance with a predetermined sequence and overriding characteristics. Other forms and modifications of this invention, both with respect to the general arrangement and the details of its respective elements, which occur to those skilled in the art after reading the present description, are intended to come within the scope and spirit of the present invention as more particularly defined in the appended claims.

I claim:
1. In a sequence operating device of the type described, a relatively fixed supporting member having a plurality of curved slots, a movable member pivotally mounted at a fixed pivot carried by said supporting member for contiguous movements with respect to said fixed supporting member, said movable member having a plurality of curved slots open to corresponding contiguous slots of said fixed member, one pair of said corresponding slots comprising a slot in said fixed member and a slot in said movable member being spaced radially from said fixed pivot a greater distance than the other said pair of corresponding slots, a plurality of controlled members each having a pivotal portion slidably engaging one of the pairs of contiguous curved slots of said movable and said fixed members, and offset portions in each of said pairs of curved slots arranged to provide a predetermined sequence of movement selectively transmitted to said controlled members upon movement of said movable member as determined by the relative positions of the offset portions of the curved slots of said fixed and movable members.

2. An overriding and sequence mechanism for the operation of a fuel supply valve and throttle comprising a support member, a pair of guide slots formed within said support member, a movable member pivotally mounted upon a fixed pivot carried by said support member for movements with respect thereto, said pair of guide slots being radially spaced from said fixed pivot, a second pair of similarly radially spaced guide slots formed within said movable member, the more distantly spaced slots in said support and movable members forming a first set of adjacent guide slots, the more closely spaced slots in said support and movable members forming a second set of adjacent guide slots, a follower element connected to a fuel valve engaging the first set of said adjacent guide slots in said support and movable members, a follower element connected to a throttle engaging the second set of said adjacent guide slots in said support and movable members, actuating means for imparting pivotal movements to said movable member about its said fixed pivot and offset terminal portions in said guide slots arranged in radial alignment with respect to said fixed pivot for the simultaneous radial shifting of both said follower elements whereby initial opening of said fuel supply valve and the subsequent opening of the throttle is accomplished while further opening of said fuel valve is prevented by overriding of said mechanism.

3. In an overriding and sequence mechanism for the operation of a fuel supply valve and throttle including a support member, a pair of guide slots associated with said support member, a movable member pivotally mounted upon a fixed pivot carried by said support member for pivotal movements with respect thereto, said guide slots radially spaced from said fixed pivot, a pair of similarly radially spaced guide slots associated with said movable member, the more remotely spaced slots in said support and movable members forming a first set of adjacent guide slots, the more closely spaced slots in said support and movable members forming a second set of adjacent guide slots, a follower element connected to a fuel valve engaging the first said set of said adjacent guide slots in said support member and said movable member, a follower element connected to a throttle engaging the second set of said adjacent guide slots in said support member and said movable member and actuating means for imparting movements to said movable member about its said fixed pivot, the improvement wherein offset terminal portions in said guide slots are arranged in radial alignment with respect to said fixed pivot for the simultaneous radial shifting of both said follower elements at the end of the first stage of movement of said actuating means during which said fuel supply valve only is opened and prior to the start of the second stage of said movement wherein the throttle only is operated and further opening of said fuel valve is prevented by overriding of said mechanism.

4. In a sequence operating device of the type described, a relatively fixed supporting member having first and second curved slots, a movable member pivotally mounted upon a fixed pivot carried by said supporting member for contiguous movements with respect to said fixed supporting member, said movable member having corresponding first and second curved slots open to and contiguous to the respective first and second slots of said fixed member, the first slots of said fixed and movable members being spaced radially from said fixed pivot a greater distance than the said second slot of each said member, a first controlled member having a pivotal portion slidably engaging the first said curved slots of said movable and said fixed members, a second controlled member having a pivotal portion slidably engaging the second said curved slots of said movable and fixed members, and offset portions in said curved slots arranged to provide a predetermined sequence of movement selectively transmitted to said controlled members upon movement of said movable member as determined by the relative positions of the offset portions of the curved slots of said fixed and movable members.

RICHARD C. SMITH.

REFERENCES CITED

The following references are of record in the file of this patent:

UNITED STATES PATENTS

| Number | Name | Date |
| --- | --- | --- |
| 245,045 | Baker | Aug. 2, 1881 |
| 621,193 | Wilson | Mar. 14, 1899 |
| 691,968 | Paine | Jan. 28, 1902 |
| 1,667,842 | Coykendall | May 1, 1928 |
| 1,985,014 | Bush | Dec. 18, 1934 |
| 2,199,095 | Banker | Apr. 30, 1940 |